United States Patent [19]

Emig et al.

[11] 4,039,345

[45] Aug. 2, 1977

[54] SHRINKAGE-COMPENSATING PORTLAND CEMENT CONCRETE AND MORTAR COMPOSITIONS

[75] Inventors: Gale L. Emig, Midland; Ronald H. Cooper, Clare; R. Douglas Eash, Midland, all of Mich.

[73] Assignee: The Dow Chemical Company, Midland, Mich.

[21] Appl. No.: 596,701

[22] Filed: July 17, 1975

Related U.S. Application Data

[63] Continuation-in-part of Ser. No. 475,377, June 3, 1974, abandoned.

[51] Int. Cl.$^2$ .............................................. C04B 7/35
[52] U.S. Cl. .................................. 106/90; 106/99; 260/29.6 S
[58] Field of Search ............... 106/90, 99; 260/29.6 S, 260/29.7 S

[56] References Cited

U.S. PATENT DOCUMENTS

| | | | |
|---|---|---|---|
| 3,043,790 | 7/1962 | Sanders | 260/29.7 S |
| 3,228,907 | 1/1966 | Eash | 260/29.6 S |
| 3,251,701 | 5/1966 | Klein | 106/100 |
| 3,834,916 | 9/1974 | Kesler | 106/99 |

*Primary Examiner*—J. Poer
*Attorney, Agent, or Firm*—Ronald G. Brookens

[57] ABSTRACT

This invention pertains to improved shrinkage compensating portland cement concrete and mortar compositions comprising essentially an expansive portland cement, mineral aggregate, from about 5 to about 25 percent based on cement weight of a styrene-butadiene-1,3 copolymer having a styrene to butadiene weight ratio of about 30:70 to 70:30, water and certain minor amounts of nonionic and anionic surfactants, and a foam depressant. When properly restrained by either external restraints or internal restraints in the form of ordinary reinforcement or fibers of various lengths, these compositions possess improved mechanical and physical properties such as compressive and flexural strengths and unexpectedly enhanced freeze-thaw resistance. Such compositions are particularly suited for use in the construction of crack-free structures.

12 Claims, 5 Drawing Figures

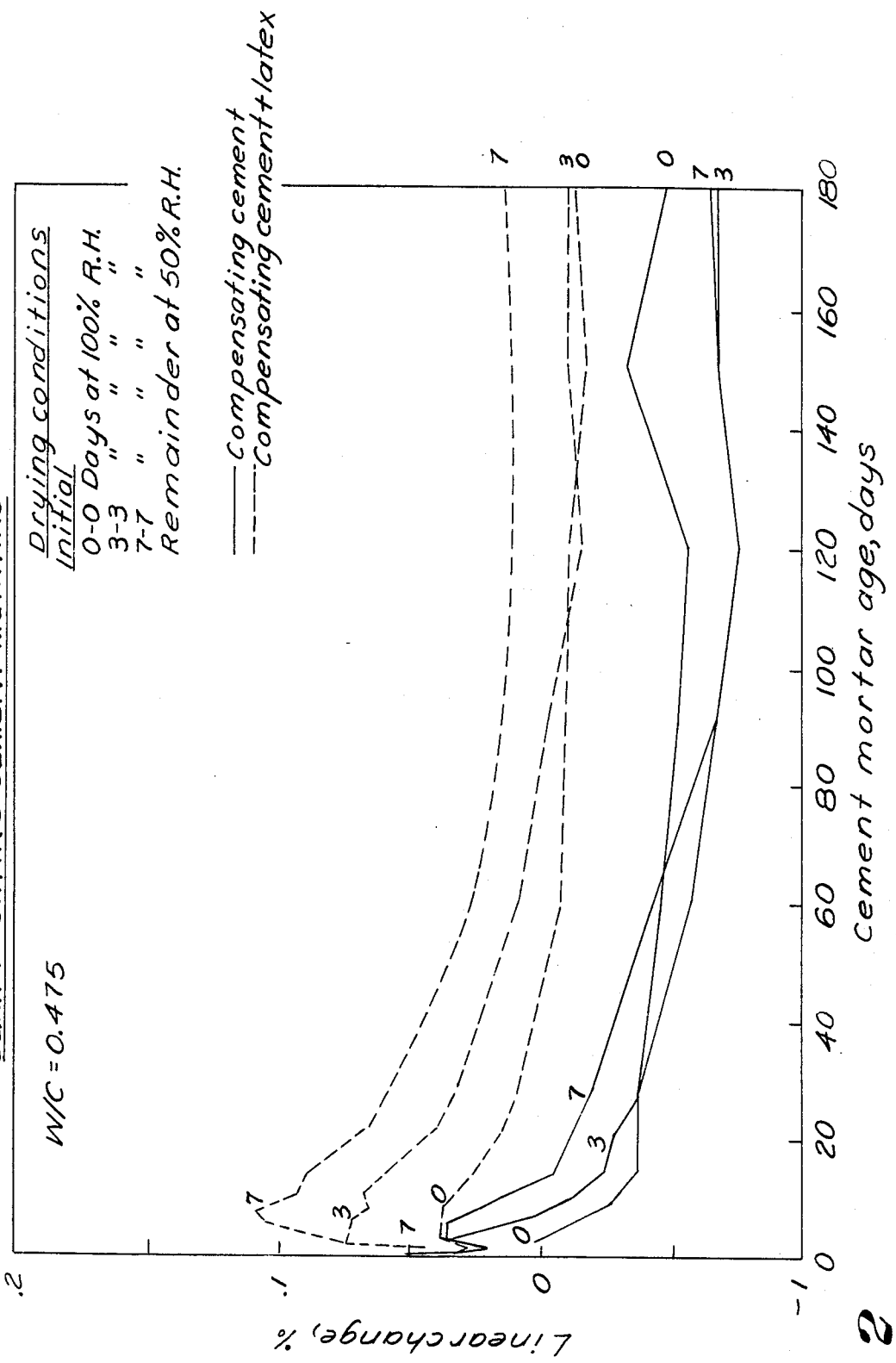

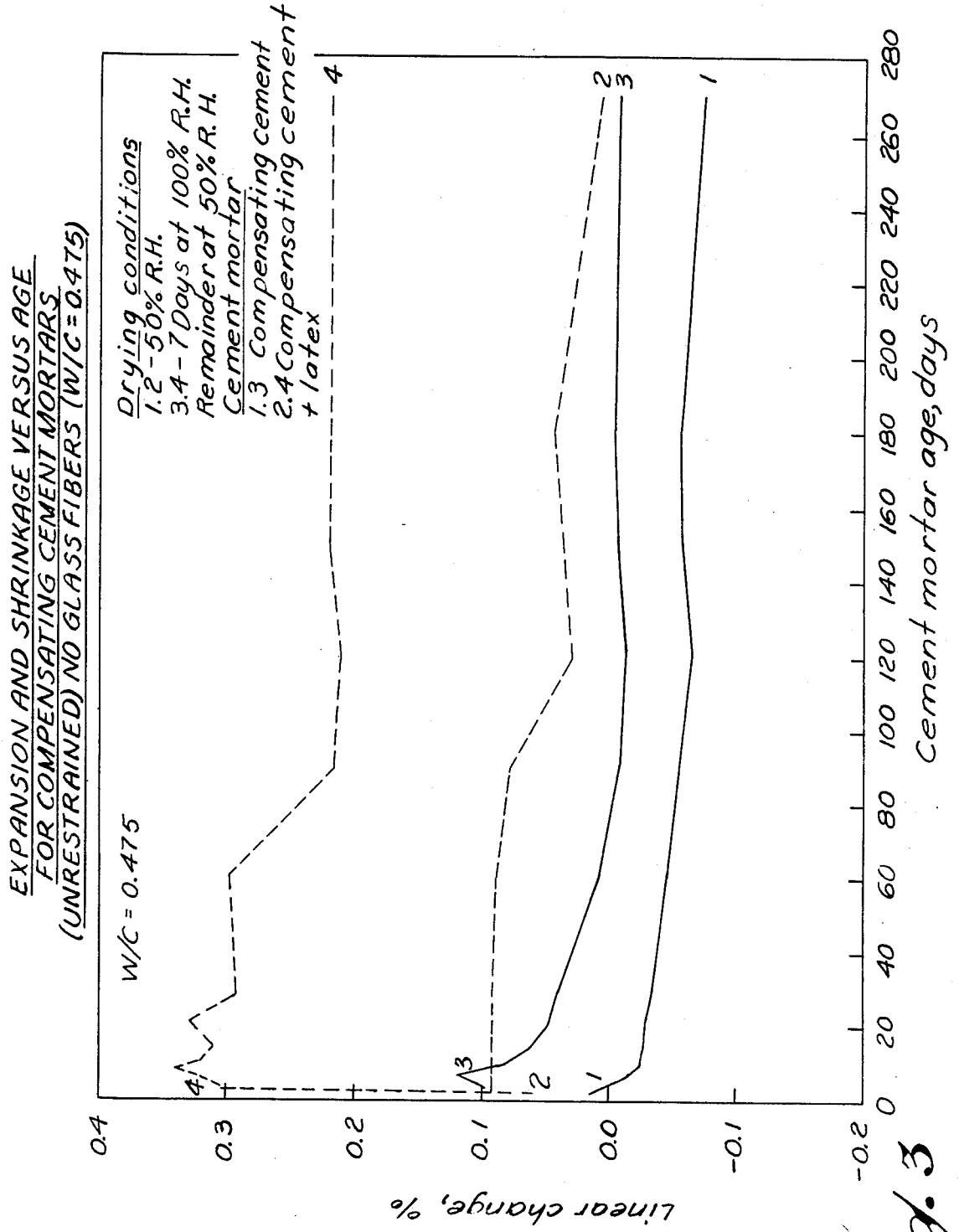

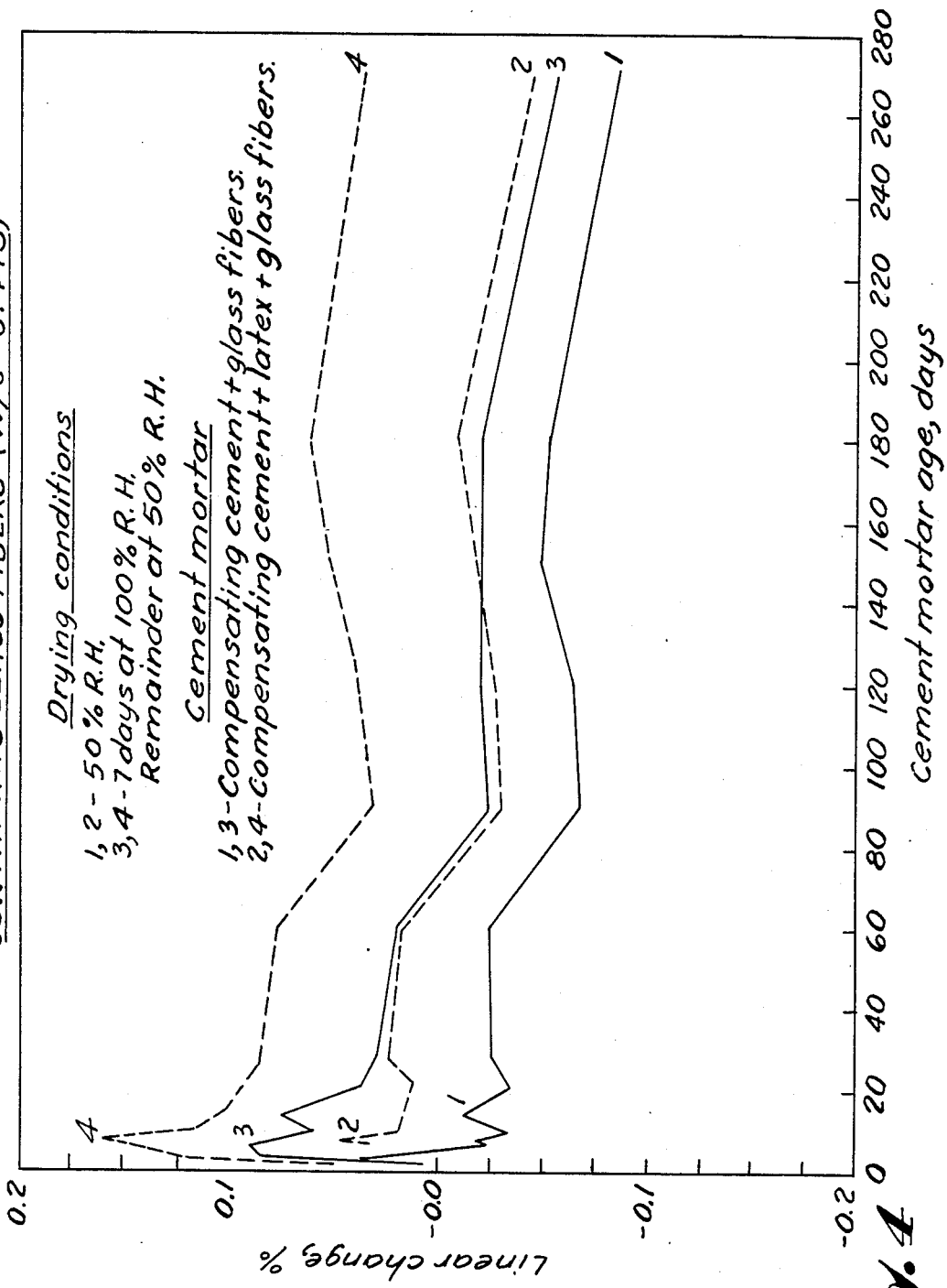

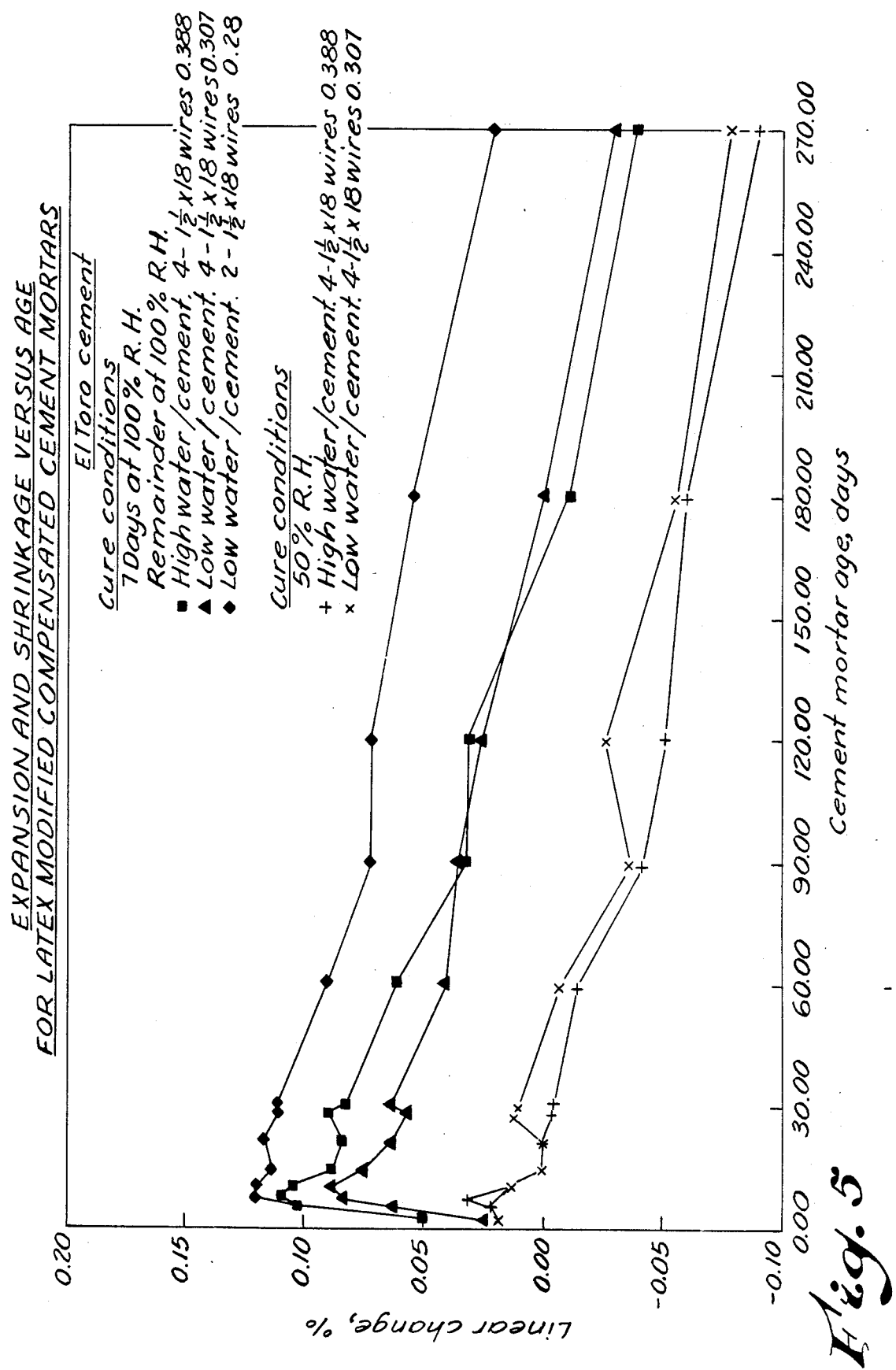

4,039,345

SHRINKAGE-COMPENSATING PORTLAND CEMENT CONCRETE AND MORTAR COMPOSITIONS

This application is a continuation-in-part of application Ser. No. 475,377, filed June 3, 1974, now abandoned.

BACKGROUND OF THE INVENTION

Certain improved expansive cements, known as Type K, Type M, and Type S, Expansive Cements have been developed recently and are being used commercially as a means of compensating for tensile stresses produced during drying of concrete. The present invention resides in the modification of such improved shrinkage compensating cements to increase the original expansion thereof; to retain a higher level of long-term or permanent expansion; to increase some of the mechanical properties such as compressive and tensile strengths; to increase certain physical properties such as freeze-thaw durability; and to achieve a higher level of initial permanent expansion without "wet" curing the concrete.

SUMMARY OF THE INVENTION

This invention provides improved shrinkage compensating concrete compositions comprising essentially an admixture of an expansive portland cement, mineral aggregate, from about 5 to 25 percent based on the weight of said cement of a styrene-butadiene-1,3 copolymer having a styrene to butadiene weight ratio of about 30:70 to 70:30, water in the amount of from about 25 to 65 percent based on the weight of said cement; and based on the weight of said copolymer, (a) from about 2 to 10 percent of nonionic surfactant, (b) from about 0.75 to 7.5 percent of anionic surfactant, at least about 15 percent of which is a sodium alkyl sulfate in which the alkyl group contains 9 to 17 carbon atoms, and (c) from about 0.1 to 5 percent of a polyorganosiloxane foam depressant based on the weight of active polyorganosiloxane, the sum of (a) and (b) not exceeding about 11 percent by weight of the copolymer and the weight ratio of (a) to (b) being within the range of about 0.7:1 to 10:1; and reinforcement to provide restraint against expansion.

DESCRIPTION OF THE PREFERRED EMBODIMENTS

Figure 1:
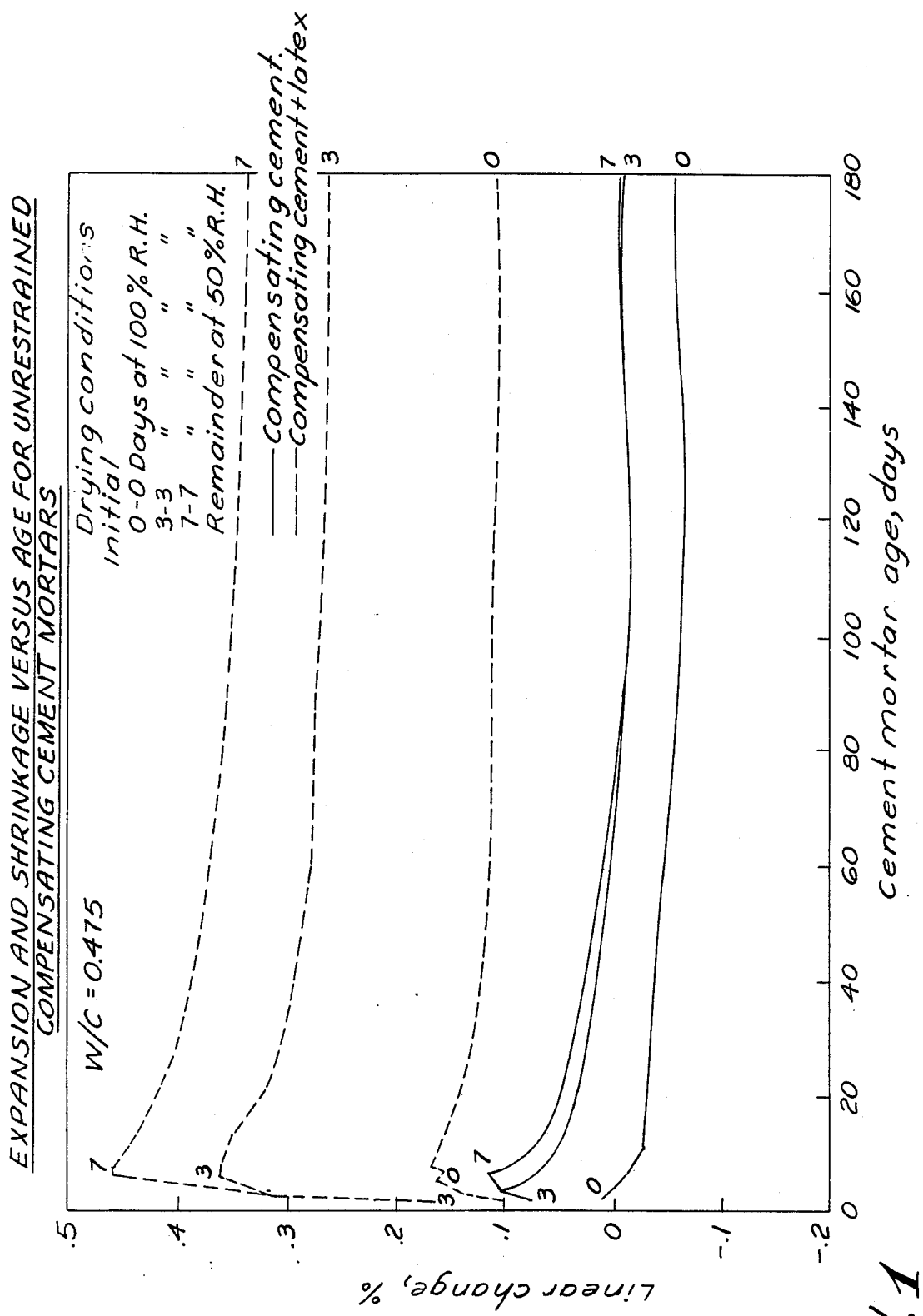

The expansive cements utilized in the present invention are as follows:

Type K: This is a mixture of portland cement compounds, anhydrous calcium sulfoaluminate ($4CaO.3Al_2O_3.SO_3$), calcium sulfate ($CaSO_4$), and lime ($CaO$). The anhydrous calcium sulfoaluminate is a component of a separately burned clinker that is interground or blended with portland cement clinker. Alternatively, it may be formed simultaneously with the portland clinker compounds.

Type M: Either a mixture of portland cement, calcium aluminate cement and calcium sulfate or an interground product made with portland cement clinker, calcium aluminate clinker and calcium sulfate.

Type S: A portland cement containing a large tricalcium aluminate content and modified by an excess of calcium sulfate above usual amounts found in other portland cements.

The styrene-butadiene-1,3 compolymers employed can be prepared in aqueous emulsion in accordance with known procedures. For example, the styrene and butadiene monomers can be mixed in the proportions corresponding to the composition of the desired copolymer in water containing an emulsifying agent or agents and heated with agitation in the presence of a peroxide catalyst to initiate copolymerization as known in the art.

The concentration of the styrene-butadiene-1,3 copolymer solids in the cement composition is, however, critical for the obtainment of the desired combination of properties required by the present invention. In this regard, concentrations less than 5 percent based on the weight of cement used, do not provide improved mechanical properties such as flexibility, abrasion resistance, and adherence. Further, total latex solids concentrations in excess of about 25 percent based on the weight of cement significantly reduce the mechanical properties of the composition.

Utilization of such copolymers in conventional portland cement, mortar compositions in known. Further, the herein described copolymers may be used in combination with other polymeric latexes, e.g., vinylidene chloride polymer latexes.

If the modified shrinkage compensating cement compositions are not properly restrained, they literally expand themselves apart so that their potential strength is seriously imparied or totally lost. In general, any conventional reinforcing material such as, for example, deformed bars, rods, or wire mesh, in the proper amounts and properly installed will provide restraint sufficient to maintain compositional strength and integrity. Fiber reinforcing materials, such as steel fibers or alkali resistant glass fibers, also provide sufficient restraint. Fibrous types or reinforcement offer several advantages. Fibers can be added to the composition during the mixing stage and hence, will be evenly dispersed and become an integral constituent of the composition. These fibers are randomly oriented and will provide three dimensional restraint.

It has been found that the combination of alkali resistant glass fiber reinforcement and latex modification creates a beneficial effect.

It has also been found that properly restrained modified shrinkage compensating cement compositions possess significantly increased freeze-thaw resistance (Table II), flexural strengths (Table III) and water absorption characteristics (Table IV).

The amount of water employed in preparing the shrinkage compensating cement compositions of the present invention is also important with regard to providing compositions of optimum workability. In this regard at least about 25 percent water, based on the weight of expansive cement, is required with an amount from about 35 to about 65 percent being preferred.

Some or all of the non-ionic and anionic surfactants employed in the cement compositions of the invention can be present while effecting copolymerization of the styrene and butadiene. Ordinarily, however, it is preferred to follow the practices used in making styrene-butadiene emulsions for use in preparing latex paints. Thus, some but not necessarily all of the anionic surfactant is introduced to aid in effecting the desired dispersion and emulsification in carrying out the copolymerization of butadiene and styrene, and the non-ionic surfactant is subsequently added to stabilize the resulting polymer dispersion. The polyorganosiloxane foam depressant and such additional quantities of non-ionic surfactant and anionic surfactant, as are required to complete the cement composition, are subsequently introduced.

Illustrative of non-ionic surfactants are, for example: fatty acid esters such as glycerol monostearate, diethyleneglycol laurate, propyleneglycol monostearate, sorbitol monolaurate, and pentaerythritol monostearate, acid derivatives of ethylene oxide products such as the reaction product of six moles of ethylene oxide with one of oleic acid; condensation products of ethylene oxide with alcohols such as stearyl alcohol; and condensation products of ethylene oxide with phenols, naphthols, and alkyl phenols such as di-t-butylphenoxynonaoxyethylene-ethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegetable oils such as sulfonated fish and castor oils; sulfonated acyclic hydrocarbons; and the like. As pointed out heretofore, at least 15 percent of the anionic surfactant component of the cement additive of the invention should be a sodium higher alkyl sulfate such as sodium lauryl sulfate and preferably the anionic surfactant component consists of a mixture of an alkyl aryl sulfonate surfactant and such sodium higher alkyl sulfate.

Illustrative of the polyorganosiloxanes are the condensation products resulting from polymerization of organo silane diols, as represented by the formula

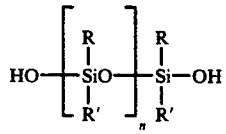

where R and R', in the above formula, represent organic radicals such as alkyl, aryl, aralkyl and alkaryl or heterocyclic groups, and $n$ is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

The aggregate employed in the present invention may be any conventionally employed manufactured aggregate or naturally occurring mineral aggregate, such as sand and a mixture or sand with gravel, crushed stone, or equivalent materials.

The cement compositions of the present invention are made by simply adding the additives to the expansive cement with mixing to obtain a cement mix of desired flow and consistency.

While it is generally convenient to prepare the cement compositions of the invention as a unitary product by pre-combining the styrene-butadiene copolymer, non-ionic and anionic surfactant, and polyorganosiloxane foam depressant, and then introducing the resulting mixture into the cement-aggregate mixture in making cement, mortar, or concrete mixes, it will be understood, of course, that it is not necessary that all the various components of the additive be so premixed. For example, equivalent cement, mortar, or concrete mixes are obtained by separate addition of the requisite quantity of styrene-butadiene copolymer emulsion containing sufficient of the anionic and non-ionic surfactants to avoid coagulation of the latex, the polyorganosiloxane foam depressant and such additional non-ionic and anionic surfactants as are necessary. The resulting compositions are particularly effective for the preparation of crack-free structures such as flat roofing or deck systems, as well as thin shell structures such as domes and the like.

The following examples, wherein all parts and percentages are to be taken by weight, illustrate the present invention.

EXAMPLES

Shrinkage compensating cement concrete compositions were prepared by admixing a Type K expansive cement with: sufficient water to form water to cement ratios of 0.29 to 0.635, a sharp mason sand in amount to provide a sand to cement ratio of about 2.75 – 1, to 3 – 1, a styrene-butadiene latex in amount to provide about 15 percent latex solids based on the weight of cement, polymethylsiloxane foam depressant in amount to provide about 0.4 percent by weight active silicon based on the weight of latex solids, and with wire mesh of various sizes and amounts or with about 1.25 percent based on the absolute volume of the total mix of alkali-resistant glass fibers to furnish restraint.

The Type K compensating cement was a mixture of portland cement compounds, anhydrous calcium sulfoaluminate $(CaO)_4(Al_2O_3)_3(SO_3)$, calcium sulfate ($CaSO_4$), and lime ($CaO$).

The styrene-butadiene latex used was composed of an aqueous emulsion of about 48 weight percent of a solid copolymer of 66 percent styrene and 34 precent butadiene-1,3; and based on the copolymer weight, 4.65 percent of the non-ionic surfactant di-t-butylphenoxynonaethylene-ethanol; and 0.78 percent of a mixture of anionic surfactants comprising predominant amounts of sodium lauryl sulfate and correspondingly lesser amounts of dodecyl-benzene sulfonate.

Expansion and shrinkage data are shown in FIGS. 1 through 5. FIGS. 1 and 2 contain data taken from 2 inches × 2 inches × 10 inches (5 × 5 × 25.4 cm) mortar bars prepared with a water-to-cement ratio of 0.475/1, a latex-to-cement ratio of 0.15/1, and a sand-to-cement ratio of 3.0/1. FIG. 1 contains data from "unrestrained" bars. FIG. 2 contains data from "restrained" bars. "Restraint" consisted of 2¼ inches × 2 inches × 2 inches (5.7 × 5 × 5 cm) end plates with a 3/16 inch (4.8 mm) threaded mild steel rod extending longitudinally through the center of the bar. Nuts were threaded onto each end of the rod to retain the end plates tightly against the bar. This type of reinforcement is similar to deformed bar reinforcement. Solid lines indicate shrinkage compensating cement compositions without latex modification. Dotted lines indicate "the invention". The lines, marked "O" represent 0 days at 100% relative humidity (R.H.). The lines marked "3" represent 3 days drying at 100% R.H. and "7" represents 7 days at 100% R.H. The rest of the drying was at 50% R.H.

FIG. 3 contains data from compositions similar to those used in FIGS. 1 and 2, except the sand-to-cement ratio is 2.75/1 and the size of the bars is 3 inches × 4 inches × 10 inches (7.6 × 10 × 25.4 cm). Dotted lines indicate "the invention" and solid lines indicate the same composition as "the invention", but without the styrene-butadiene-1,3 additive. Lines 1 and 2 were at 50% R.H. Lines 3 and 4 were 7 days at 100% R.H. and the remainder at 50% R.H. Lines 1 and 3 represent compensating cement and 2 and 4 represent compensating cement plus latex.

In FIG. 4 are arrayed data from a composition included in "the invention". Latex-to-cement ratio is 0.15/1, water-to-cement ratio is 0.475/1, and sand-to-cement ratio is 2.75/1. The bar size is 3 inches × 4 inches × 10 inches (7.6 × 10 × 25.4 cm). The drying conditions were as in FIG. 3, Lines 1 and 3 represent compensating cement plus glass fibers, lines 2 and 4 represent compensating cement plus latex plus glass fibers.

FIG. 5 includes data from 3 inches × 4 inches × 10 inches (7.6 × 10 × 25.4 cm) bars with layers of wire mesh included as the reinforcement for restraint. This composition is included in "the invention". Latex-to-cement ratio is 0.15/1, sand-to-cement ratio is 3/1, and water-to-cement ratios range from 0.283/1 to 0.388/1.

El Toro cement was employed in this example. Curve □ (square) represents a water-to-cement ratio of 0.388, curve Δ (triangle respresents a water-to-cement ratio of 0.307 and curve ◊ (diamond) represents a water-to-cement ratio of 0.28. The square and triangle curves included 4 layers of wire mesh having a 1½ inch (3.8 cm) hexagonal opening and having a weight of 0.77 kgs/sq. meter. The diamond curve included 2 layers of the same wire.

Curving was at 100% R.H. for the square, diamond and triangle curves and at 50% R.H. for the + and × curves. The + curve represents a water-to-cement ratio of 0.388 and the × curve a water to cement ratio of 0.307. Each of the curves represent cement containing 4 layers of the indicated wire.

It is praticularly important to note in FIGS. 1 through 5, that the compositions designated as "the invention" are characterized by having a pronounced enhanced initial expansion, as well as a more permanent expansion during aging as compared to the compositions where no latex is present. Also, where no reinforcement is present, the compositions containing the latex have a higher initial and permanent expansion, as compared to the unmodified compositions. This feature would be desirable for use with "self-stressing" expansive cements. These cements are portland cements with additional expansive components, as compared to ordinary expansive cements, to cause increased and more permanent expansion. These cements are used for chemical prestressing of reinforced concrete. The increased expansion causes increased prestressing forces when adequately restrained. The increased and more permanent expansion exhibited by compositions characterized as "the invention" will be desirable for use with "self-stressing" cements in chemical prestressing applications.

The data in Table I were taken from 2 inches × 2 inches (5 × 5 cm) cubes cut from the center portions of 18 inches × 18 inches (45.7 × 45.7 cm) plates, 2 inches (5 cm) thick. The mold sides of the 18 inches × 18 inches (45.7 × 45.7 cm) specimen molds were removed at 24 hrs. so that no external restraint could be applied from the mold sides. The only restraint (after 24 hrs) was internal restraint offered by the presence of reinforcements (glass fibers or wire mesh). The internal reinforcement was of two types: hexagonal wire mesh weighing 1.42 pounds/sq. yd. (.77 kg/sq meters) and alkali resistant glass fibers, ½ inch (1.27 cm) long. Three layers of wire reinforcement were utilized for Mixes E, F, G, H. Mixes C and D utilized 1¼% (based on absolute volume of the mix) alkali resistant glass fibers as the internal reinforcement. Two cure schedules were used: Cure A consisted of curing at 100% relative humidity (R.H.) and 23° C. for seven days with the remainder at 50% R.H. and 23° C. Cure B was 50% R.H. and 23° C. until testing. All specimens were 45 days old at testing.

A significant and unexpected result is shown in Table No. 1. Comparison of Mixes E and G, show that the control mixes (no latex) lose a significant amount of strength without any cure at 100% R.H. cure. Mixes F and H, on the other hand do not show this loss of strength without any 100% R.H. cure. It is well documented in the art that shrinkage compensating cement concretes without latex modification require 3–5 days curing at 100% R.H. The addition of the presently prescribed latex eliminate this requirement.

Table I

| Mix | Latex/cement ratio | Types of Reinforcement | Compressive Strength, psi (kg/sq cm) |
|-----|---|---|---|
| A | 0 | None | 3695 (259) |
| B | .15 | " | 6050 (424) |
| C | 0 | glass/fiber | 5810 (407) |
| D | .15 | " | 6045 (423) |
| E | 0 | 3 layers of wire mesh | 4120 (288) |
| F | .15 | " | 6360 (445) |
| G | 0 | " | 3200 (224) |
| H | .15 | " | 6600 (462) |

Note 1.
All mixes had a sand-to-cement ratio by weight of 3 to 1. Control mixes A, C, E, and G had a water-to-cement ratio of about 0.57 to 1. The latex mixes B, D, F and G had a water-to-cement ratio of about 0.38 to 1. Mixes A, B, C, D, E and F were cured 7 days at 23° C. and 100% Relative humidity (R.H.) followed by 38 days cure at 23° C. and 50% R.H. Mixes G and H were cured 45 days at 23° C. and 50% R.H.
Note 2.
Mixes B, D, F and G had a latex solids-to-cement ratio by weight of 0.15 to 1.

The following Table II sets forth freeze-thaw durability data for the referred to compositions, as a measure of total number of freeze-thaw cycles completed, total weight loss and final relative modulous of elasticity.

TABLE II
DURABILITY (FREEZE-THAW) OF RESTRAINED SHRINKAGE COMPENSATING CEMENT MORTARS

| Layers of Hexagonal Wire Mesh (.77 kg/sq yd) | Water-Cement Ratio | Cure % R.H. | Cure Age, Days | Freeze-Thaw Cycles Completed | Total Weight Loss, (%) | Final Relative Dynamic Modulus of Elasticity (%) |
|---|---|---|---|---|---|---|
| I. Non-Modified Shrinkage Compensating Cement Mortars | | | | | | |
| 2 | 0.53 | 100 | 28 | 545 | 11.41 | 58 |
| II. Latex Modified Shrinkage Compensating Cement Mortar | | | | | | |
| 4 | 0.39 | 50 | 28 | 317 | 10.81 | 71 |
| 4 | 0.39 | 50 | 131 | 610 | 4.93 | 75 |
| 4 | 0.39 | 100 | 28 | 345 | 5.30 | 60 |
| 4 | 0.39 | 100 | 60 | 826 | 6.06 | 63 |
| 7 | 0.37 | 50 | 28 | 356 | 18.55 | 62 |
| 4 | 0.37 | 50 | 60 | 472 | 10.12 | 61 |
| 4 | 0.37 | 100 | 28 | 1257 | 12.49 | 72 |
| 4 | 0.37 | 100 | 60 | 1114 | 9.73 | 81 |
| III. Latex Modified Shrinkage Compensating Cement Mortar Containing 1 ¼% Glass Fibers | | | | | | |
| | 0.55 | 50 | 28 | 120 | 4.15 | 66 |
| | 0.55 | 100 | 28 | 179 | 8.56 | 57 |
| | 0.40 | 50 | 28 | 586 | 6.21 | 60 |
| | 0.40 | 100 | 28 | 625 | 4.89 | 68 |
| | 0.55 | 50 | 107 | 189 | 1.69 | 70 |
| | 0.55 | 100 | 60 | 236 | 5.29 | 60 |
| | 0.40 | 50 | 93 | 717 | 4.27 | 74 |
| | 0.40 | 100 | 60 | 693 | 2.74 | 63 |

The following Table III sets forth comparative flexural strength properties for a series of cement compositions as described herein. This data shows that the 3/16 inch (4.76 mm) rods and the glass fibers offer the same degree of restraint and result in about equal flexural strengths in the control mix. In the mixes containing the latex (the invention) the flexural strength of the mix containing the glass fibers is considerably and unexpectedly increased over the flexural strength of the latex mix restrained with the rod.

TABLE III
Flexural Strength of Latex Modified-Shrinkage Compensating Cement Mortars (Restrained)[1]

| Composition | Restraint | W/C Ratio | Cure[2] | Flexural Strength psi (kg/sq cm) |
|---|---|---|---|---|
| Compensating Cement (Control) | 3/16" rod (4.76 mm) | .635 | A | 750 (52.5) |
| | 3/16" rod (4.76 mm) | .635 | B | 1030 (72.1) |
| Compensating Cement | 3/16" rod (4.76 mm) | .635 | A | 1220 (85.4) |
| | 3/16" rod (4.76 mm) | .635 | B | 1680 (117.6) |
| plus latex (the invention) | | .475 | A | 1500 (105) |
| | | .475 | B | 1750 (122.5) |
| Compensating Cement (Control) | Glass Fibers | .635 | A | 800 (56) |
| | Glass Fibers | .635 | B | 1175 (82.25) |
| | | .55 | A | 940 (65.8) |
| | | .55 | B | 1260 (88.2) |
| Compensating Cement plus latex | Glass Fibers | .635 | B | 1680 (117.6) |
| | Glass Fibers | .475 | A | 2015 (141) |
| | | .475 | B | 2120 (148.4) |

TABLE III-continued
Flexural Strength of Latex Modified-Shrinkage Compensating Cement Mortars (Restrained)[1]

| Composition | Restraint | W/C Ratio | Cure[2] | Flexural Strength psi (kg/sq cm) |
|---|---|---|---|---|
| (the invention) | | | | |

[1]2" × 2" × 10" (5 × 5 × 25.4 cm) prisms
[2]Cure A — 23° C. and 50% RH.
Cure B — 7 days at 23° C. and 100% RH, remainder at 23° C. and 50% R.H.

The following Table IV sets forth water absorption values over a 24-hour period for additional compositions. These compositions differ from the previously described compositions containing glass fibers only in the ratios of water and cement used. Such data is further evidence of the desirable synergistic properties associated with the compositions of "the invention" containing a combination of styrene-butadiene-1,3 latex and alkali resistant glass fibers.

TABLE IV
24 HOUR WATER ABSORPTION OF COMPENSATING CEMENT MORTARS

| | Absorption, Percent | | | |
|---|---|---|---|---|
| Cure Conditions | Comparison A (without latex or glass fibers) W/C = 0.635 | Comparison B (with fibers but without latex) W/C = 0.635 | Comparison C (with latex but without glass fibers) W/C = 0.635 | The Invention (with latex and glass fibers) W/C = 0.635 |
| 28 days at 50% R.H. 23° C. | 8.75 | 9.18 | 7.29 | 6.95 |
| 7 days at 100% R.H. 21 days at 50% R.H. 23° C. | 6.36 | 7.50 | 4.13 | 3.65 |

W/C = Water Cement Ratio

What is claimed is:

1. Improved shrinkage compensating portland cement concrete and mortar compositions containing essentially an admixture of an expansive portland cement, mineral aggregate, from about 5 to about 25 percent based on the weight of said cement of a styrene-butadiene-1,3 copolymer having a styrene to butadiene weight ratio, of about 30:70 to 70:30, water in amount of from about 25 to about 65 percent based on the weight of said cement; and based on the weight of said copolymer, (a) from about 2 to about 10 percent of non-ionic surfactant, (b) from about 0.75 to 7.5 percent of anionic surfactant, at least about 15 percent of which is a sodium alkyl sulfate in which the alkyl group contains 9 to 17 carbon atoms, and (c) from about 0.1 to 5 percent of a polyorganosiloxane foam depressant based on the weight of active polyorganosiloxane, the sum of (a) and (b) not exceeding about 11 percent by weight of said copolymer and the weight ratio of (a) to (b) being within the range of about 0.7:1 to 10:1; and reinforcement to provide restraint against expansion.

2. The composition of claim 1, wherein the non-ionic surfactant is di-t-butyl-phenoxynonaoxyethylene-ethanol, the anionic surfactant comprises a mixture of an alkyl aryl sulfonate and a sodium alkyl sulfate and the polyorganosiloxane foam depressant is polymethyl siloxane.

3. The composition of claim 2, wherein said alkyl aryl sulfonate is dodecylbenzene sodium sulfonate and said sodium alkyl sulfate is sodium lauryl sulfate.

4. The composition of claim 3, wherein said copolymer is a copolymer of about 66 percent styrene and about 34 percent butadiene.

5. The composition of claim 4, wherein said expansive portland cement is Type K expansive cement.

6. The composition of claim 5, wherein said reinforcement is alkali resistant glass fibers.

7. In the process of preparing portland cement concrete and mortar structures, the improvement consisting of forming said structures from a reinforced shrinkage compensating concerete composition comprising an admixture of an expansive portland cement, mineral aggregate, from about 5 to about 25 percent based on the weight of said cement of a styrene-butadiene-1,3 copolymer having a styrene to butadiene weight ratio, of about 30:70 to 70:30, water in amount of from about 25 to about 65 percent based on the weight of said cement; and based on the weight of said copolymer, (a) from about 2 to about 10 percent of anionic non-ionic surfactant, (b) from about 0.75 to 7.5 percent of anionic surfactant, at least about 15 percent of which is a sodium alkyl sulfate in which the alkyl group contains 9 to 17 carbon atoms, and (c) from about 0.1 to 5 percent of a polyorganosiloxane foam depressant based on the weight of active polyorganosiloxane, the sum of (a) and (b) not exceeding about 11 percent by weight of said copolymer and the weight ratio of (a) to (b) being within the range of about 0.7:1 to 10:1; and reinforcement to provide restraint agaist expansion.

8. The process of claim 7, wherein the non-ionic surfactant is di-t-butyl-phenoxynonaoxyethylene-ethanol, the anionic surfactant comprises a mixture of an alkyl aryl sulfonate and a sodium alkyl sulfate and the polyorganosiloxane foam depressant is polymethylsiloxane.

9. The process of claim 8, wherein said alkyl aryl sulfonate is dodecylbenzene sodium suifonate and said sodium alkyl sulfate is sodium lauryl sulfate.

10. The process of claim 9, wherein said copolymer is a copolymer of about 66 percent styrene and about 34 percent butadiene.

11. The process of claim 10, wherein said expansive portland cement is Type K expansive cement.

12. The process of claim 11, wherein said reinforcement is alkali resistant glass fibers.

* * * * *